(12) United States Patent
Tendler

(10) Patent No.: US 6,516,198 B1
(45) Date of Patent: Feb. 4, 2003

(54) SYSTEM FOR LOCATION REPORTING

(75) Inventor: Robert K. Tendler, Chestnut Hill, MA (US)

(73) Assignee: Tendler Cellular Inc, Boston, MA (US)

( * ) Notice: Subject to any disclaimer, the term of this patent is extended or adjusted under 35 U.S.C. 154(b) by 0 days.

(21) Appl. No.: 09/455,894

(22) Filed: Dec. 6, 1999

(51) Int. Cl.[7] .................................................. H04Q 7/20
(52) U.S. Cl. ........................ 455/456; 455/95; 455/575
(58) Field of Search .................................. 455/456, 457, 455/414, 550, 575, 90, 95, 566

(56) References Cited

U.S. PATENT DOCUMENTS

| | | | |
|---|---|---|---|
| 4,833,477 A | | 5/1989 | Tendler |
| 5,144,323 A | | 9/1992 | Yonkers |
| 5,193,215 A | | 3/1993 | Olmer |
| 5,414,432 A | | 5/1995 | Penny, Jr. et al. |
| 5,519,403 A | | 5/1996 | Bickley et al. |
| 5,555,286 A | | 9/1996 | Tendler |
| 5,557,254 A | | 9/1996 | Johnson et al. |
| 5,587,715 A | | 12/1996 | Lewis |
| 5,630,206 A | * | 5/1997 | Urban et al. ............... 455/54.1 |
| 5,650,770 A | | 7/1997 | Schlager et al. |
| 5,673,305 A | | 9/1997 | Ross |
| 5,748,147 A | * | 5/1998 | Bickley et al. ............. 342/457 |
| 5,794,151 A | * | 8/1998 | McDonald et al. ......... 455/454 |
| 6,044,257 A | * | 3/2000 | Boling et al. ............... 455/404 |
| 6,085,090 A | * | 7/2000 | Yee et al. ................... 455/440 |
| 6,091,956 A | * | 7/2000 | Hollenberg et al. ......... 455/456 |
| 6,236,365 B1 | * | 5/2001 | LeBlanc et al. ............. 342/547 |
| 6,295,449 B1 | * | 9/2001 | Westerlage et al. ......... 455/422 |
| 6,334,061 B1 | * | 12/2001 | Cunningham et al. ....... 455/553 |

* cited by examiner

*Primary Examiner*—Thanh Cong Le
*Assistant Examiner*—Thuan T. Nguyen
(74) *Attorney, Agent, or Firm*—Robert K. Tendler

(57) ABSTRACT

An audio coupling is provided between a location reporting unit and the microphone of a wireless phone in which location information is provided either by synthesized voice and/or DTMF tones through the audio coupling to the microphone such that the location of the wireless phone can be broadcast on the normal voice channel to a dispatch operation such as a Public Safety Answering Point or to a location-based service provider. The subject interface makes possible the adaptation of any wireless phone to provide location-based information without change to the wireless phone and without any additional infrastructure for the wireless network. The utilization of synthesized speech and/or DTMF tones over the voice channel provides a universality for the system, which can be utilized anywhere where there is both wireless and GPS satellite coverage.

14 Claims, 5 Drawing Sheets

SYSTEM FOR LOCATION REPORTING

FIELD OF INVENTION

This invention relates to location-based devices and more particularly to a universal system for location reporting which transmits either synthesized voice or a digital representation of position over the voice channel.

BACKGROUND OF THE INVENTION

As will be appreciated, in the past there have been numerous systems for reporting location to a dispatch operation from a wireless device, be it a handset or a fixed mount unit. As discussed in U.S. Pat. No. 4,833,477 issued to Robert K. Tendler, a system is provided for taking the output of a geolocation navigation unit, converting it into speech and transmitting the speech via wireless phone or other wireless communication device to a dispatch office or Public Safety Answering Point. Other patents involving location-based reporting are U.S. Pat. Nos. 5,193,215; 5,144.323; 5,555.286; 5,519,403; 5,414,432; 5,587,715; 5,557,254; 5,673,305 and 5,650,770. Central to most of the above location reporting systems is a change in infrastructure to permit the location reporting. For instance, in triangulation-based systems, a so-called head end system must be provided at each cell tower to provide the location information, which is then encoded in a specialized code and transmitted through the network to the dispatch office.

In addition, there are several GPS-assisted systems such as those offered by SnapTrack and IDC in which specialized communication channels are provided between the handset and the dispatch office.

The problem with all of the above systems is that they require additional infrastructure or additional invasion into the handset in order to provide location reporting from the handset to the ultimate recipient or dispatch office. Modifying handsets is indeed problematic because not only must the operation of the handset be altered in some manner in order to accommodate the location reporting, co-locating the GPS antenna with the handset-carried wireless antenna oftentimes causes interference problems. These interference problems start to exist when the GPS antenna is brought from a distance towards the wireless antenna, such that when the GPS antenna is within two inches of the wireless antenna interference starts to occur. Co-location of the GPS antenna and the wireless phone antenna, for instance at a spacing of one-quarter inch, results in measures which must be taken to eliminate the interference between the wireless phone and the GPS receiver.

There have been attempts in the past to link a GPS receiver to a wireless phone through a so-called hardwired umbilical cord which requires interconnection of the location reporting unit to the wireless phone unit within the wireless phone. While this type of system has been produced in the past, it does not result in a universally adaptable system without invasion into the wireless phone itself. As a result, wireless handsets need to be modified in order to provide the location reporting function.

SUMMARY OF THE INVENTION

Rather than hardwiring the location reporting unit to the wireless phone, in the subject invention an audio coupling is provided between the location reporting unit and the microphone normally utilized at the wireless handset. The information transmitted through the audio coupling, is in one embodiment, a synthesized speech rendition of the latitude and longitude developed as a result of decoding the output of a GPS receiver. This speech is coupled through the audio coupling to the microphone of the wireless handset and is then transmitted as over the voice channel to a dispatch office.

Additionally, in one embodiment, a DTMF tone generator is utilized in the location reporting unit to decode the output of the GPS receiver and to translate this output into DTMF tones, in embodiment in an ASCII II format, which is again impressed onto the voice channel by the audio coupling to the microphone, where it is then transmitted to the dispatch office in the normal manner that the voice channel is used for human transmitted speech.

What is accomplished is the provision of a locator module which is coupled to any wireless transmitter having a microphone through an audio coupling, with the location information being transmitted on the existing voice channel without either modification of the wireless transmitter or the network through which the communication is established. Thus, any wireless transmitter can be adapted to be a location reporting devise without modification. Moreover, the network over which the location reporting is transmitted need not be modified in any way.

While the subject device will be described in connection with wireless handsets, it will be appreciated that any wireless communication device having a microphone is within the scope of this invention. Thus, the subject locator module may be utilized in connection with SSB radios, VHF radios, CB radios, family radios and with those satellite communication systems which support voice channels.

In one embodiment, the audio coupling is through the utilization of a coupler which may be placed over the microphone carried by the handset, with the attachment to the handset either being via suction, adhesive attachment or mechanical attachment.

In another embodiment, the locator module may be configured to house the wireless phone so as to perform a cradle-like function in which the handset is attached to the cradle, with the cradle providing an acoustic coupling between itself and the microphone of the handset. In this embodiment, the GPS receiver, the GPS antenna, the location board and the optional battery may be contained within the cradle, with the phone being able to report location when it is in the cradle.

What is therefore accomplished is that rather than utilizing complicated signaling systems such as packet data, modems, and other proprietary signaling systems for the reporting of location information, a simplified system is provided in which no modifications whatsoever need to be made to the handset, much less any other type of wireless communication device. The only requirement is that there be an audio coupling between the output of either a speech synthesizer or a DTMF generator, or both, to the microphone of the wireless device. This makes the adaptation of any wireless device a location reporting device with no incursion into the device itself.

Thus the more than 60 million cell phones presently in operation in the United States may be adapted to location reporting phones by the mere provision of the audio coupling and the locator module.

In one embodiment, the locator module includes an integrally carried GPS antenna, whereas in another embodiment the GPS antenna is separate from the locator module. Moreover in the preferred embodiment, the locator module has an internal battery for powering the GPS receiver and antenna as well as the location reporting unit, which includes a speech synthesizer, DTMF tone generator and audio amplifier. Alternatively, external power may be provided to the locator module such that if the locator module is utilized as a handset cradle in a vehicle, the power for the unit may come from the vehicle battery itself.

It will be appreciated that not only is latitude and longitude reportable by virtue of the subject audio coupling, any other messages which are either in synthesized voice or DTMF tone coding can be provided in this manner. This means that not only can location be transmitted, but also the telephone number or mobile identification number of the wireless phone, the license tag number of the vehicle, the time since last fix if a GPS receiver is utilized, and indeed any other type of information which is generated outside of the handset.

It is only important that the signaling be done over the voice channel as such and as part of the subject invention DTMF tones may be transmitted over the voice channel to report position.

Moreover, while GPS location receivers are described herein, any location reporting apparatus is within the scope of this invention as long as the location coordinates can be translated into either speech or DTMF coding. Moreover, it is not necessary that DTMF coding be the only coding utilized. Any coding which results in audio signals to be transmitted over the wireless voice channel is within the scope of this invention.

In summary, an audio coupling is provided between a location reporting unit and the microphone of a wireless phone in which location information is provided either by synthesized voice and/or DTMF tones through the audio coupling to the microphone such that the location of the wireless phone can be broadcast on the normal voice channel to a dispatch operation such as a Public Safety Answering Point or to a location-based service provider. The subject interface makes possible the adaptation of any wireless phone to provide location-based information without change to the wireless phone and without any additional infrastructure for the wireless network. The utilization of synthesized speech and/or DTMF tones over the voice channel provides a universality for the system, which can be utilized anywhere where there is both wireless and GPS satellite coverage.

BRIEF DESCRIPTION OF THE DRAWINGS

These and other features of the Subject Invention will be better understood in connection with the Detailed Description in conjunction with the Drawings, of which.

DETAILED DESCRIPTION

Figure 1:
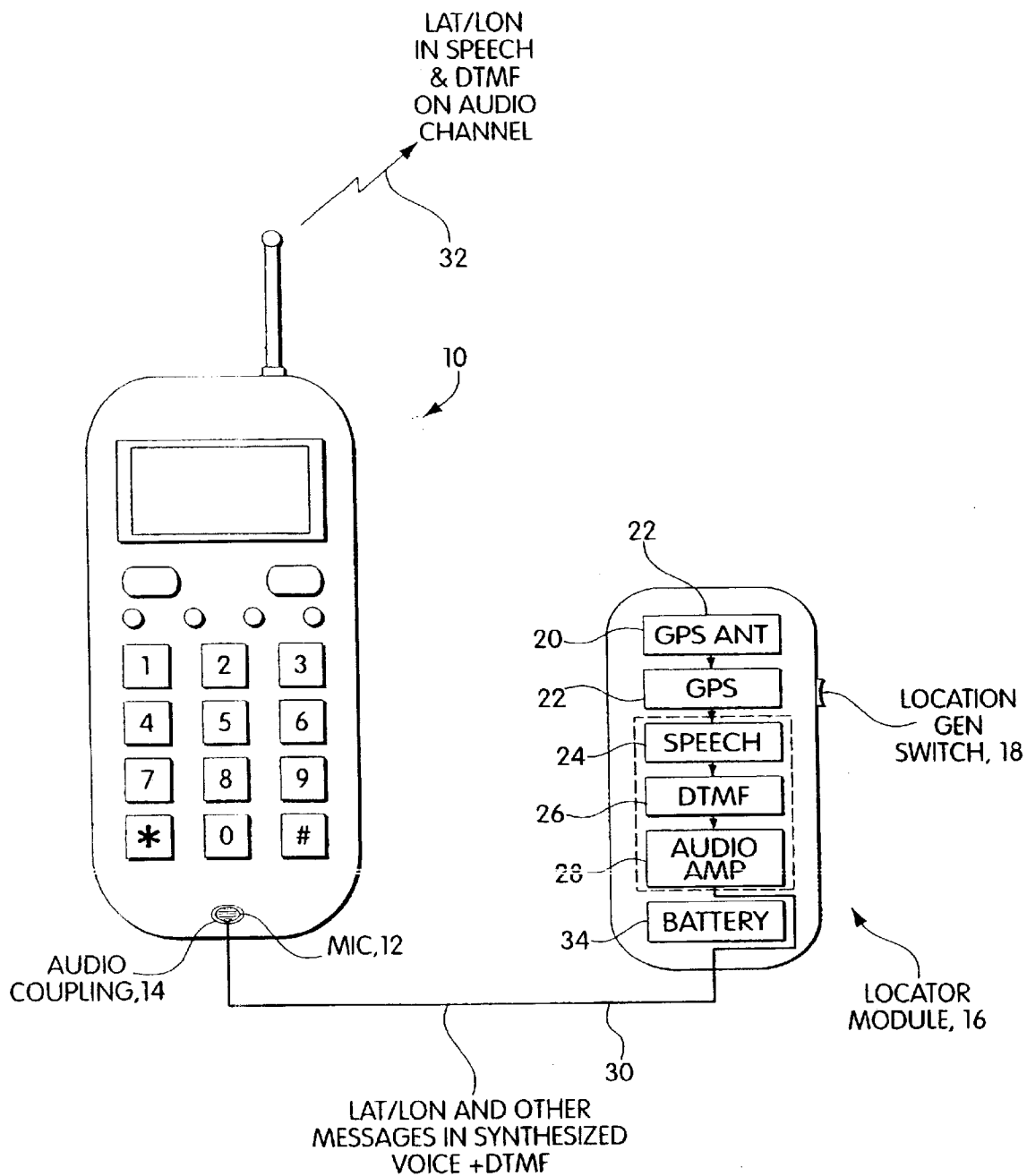
FIG. 1 is a schematic and diagrammatic illustration of the subject system showing the audio coupling between a location reporting unit and a wireless phone.

Referring now to FIG. 1 in a typical situation a handset 10 having a microphone 12 is provided with an audio coupling device 14 which couples audible latitude and longitude or other messages in synthesized voice or DTMF tones to microphone 12. These signals are generated at a locator module 16 which has a location generation switch 18 that activates the unit to report the location generated by an onboard GPS receiver 20 to which is coupled a GPS antenna 22.

The output of the GPS receiver, or any other location-determining device, is a digital representation of the position in terms of latitude and longitude. This is converted by a speech synthesizing unit 24 to a verbal rendition of latitude and longitude, or any other information required to be transmitted.

In one embodiment, the output of the GPS receiver 20 is also coupled to a DTMF tone generator 26, with the output of both speech synthesizing unit 24 and DTMF tone generator 26 being amplified by an audio amplifier 28. The output of audio amplifier 28 is coupled by a line 30 to audio coupling unit 14 such that that which is coupled into microphone 12 is a verbal rendition or DTMF tone rendition of the latitude and longitude which is to be transmitted by the wireless handset. Thus, as illustrated by arrow 32, the latitude and longitude is transmitted in synthetic speech and DTMF tones over the normal voice channel for the wireless unit. Note that the locator module may include an internally carried battery 34 for the powering of the internal circuits including the GPS receiver, GPS antenna, speech synthesizer, DTMF encoder and audio amplifier.

It will be appreciated that it does not matter what type of wireless unit is utilized. For instance, it can be a cellular phone adapted for either AMPS, CDMA or TDMA service. Moreover, it can be a wireless handset which operates on the GSM mode. The wireless unit may also be any type of transmitter which has a voice channel such as an SSB radio, a VHF radio, or any other type of RF transmission device in which human voice is transmitted in some form over a voice channel.

Included in this scenario are digital phones in which the analog signal is first digitized in a modulation section and transmitted in digital form to the cell site. When the call is received, the digitally encoded audio is converted back to analog form thus restoring the audio in terms of speech or DTMF tones.

As such, whether the voice channel carries speech and audio tones transmitted in digital or analog form makes no difference to the subject invention. The only thing that is important is that the information be transmitted over a voice channel or a channel capable of supporting both voice and audio tones. While DTMF tones are discussed herein, it will be appreciated as any digital signaling method which impresses signals on the voice channel is within the scope of the subject invention.

Figure 2:
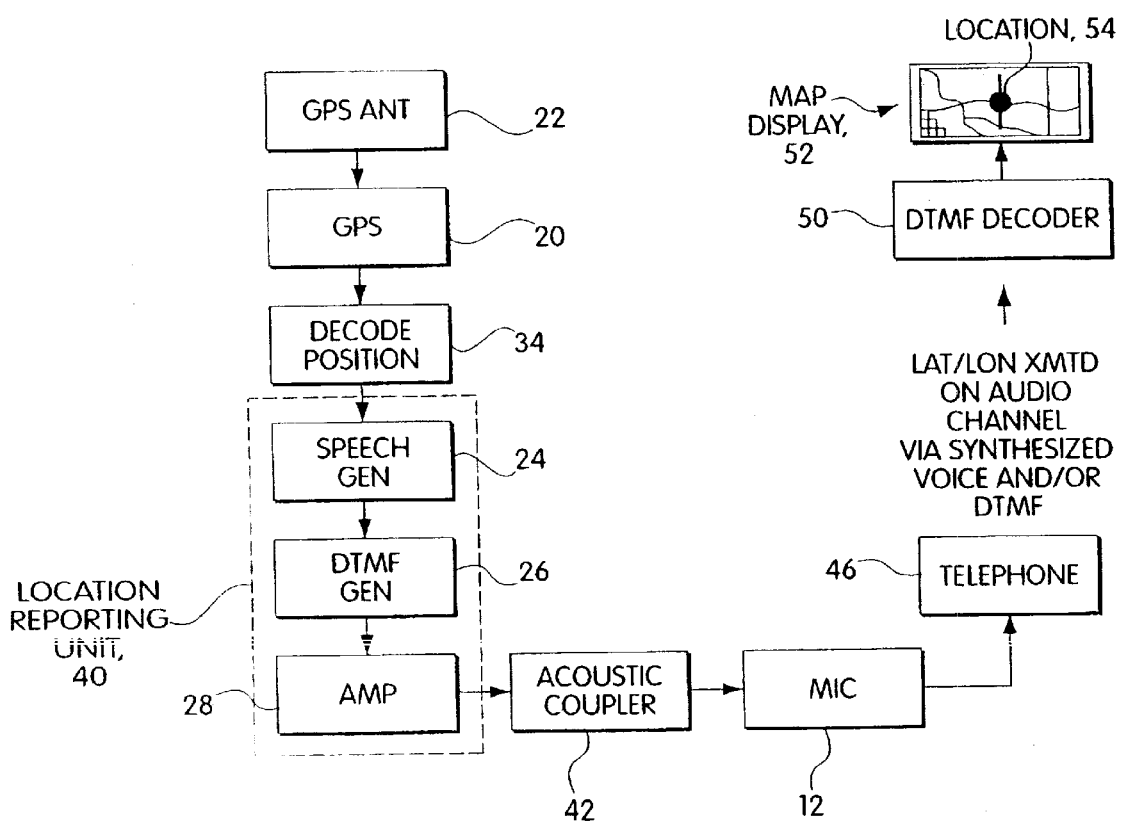
FIG. 2 is block diagram illustrating the subject system showing the utilization of an acoustic coupler between the location reporting unit and the microphone of the particular transmitter involved, also illustrating the utilization of a DTMF decoder and an electronic map display in which the location of the locator module is illustrated.

Referring now to FIG. 2, in one embodiment the locator module has the aforementioned GPS antenna 22 coupled to GPS receiver 20. The output of the GPS receiver is coupled to a position decoder unit 34. The purpose of the position decoder unit is to provide an output in an appropriate format to be applied to speech synthesizing unit 24 or DTMF tone generator 28. In one embodiment the position is in terms of the NMEA 0183 format, whereas as the position decoder unit 34 may also put out signals which result in ASC II tone generation. The output of either the speech synthesizer or the DTMF tone generator is applied to the aforementioned audio amplifier 28, with units 24, 26 and 28 forming a location reporting unit 40 as illustrated by the dotted outline. The resulting signals are applied to an audio coupling unit 42 which serves as the audio coupling unit 14 of FIG. 1, with the output of the audio coupling unit being applied to microphone 12. Microphone 12 is coupled to the modulation section of a wireless telephone in the illustrated embodiment here illustrated at 46, with the latitude and longitude transmitted over the voice channel via synthesized voice and/or DTMF tone generation.

On the receiver end, a DTMF decoder 50 is utilized in one embodiment to decode the position and to drive an electronic map display 52, such that the location 54 of the caller is displayed on the map. Such a DTMF decoder is available from Motron, with the electronic map being available from Delorme Corporation as Street Atlas 6.0.

It will be appreciated that latitude and longitude is communicated over a voice channel to the recipient through the utilization of a wireless device in which this information is injected into the audio path of the device.

Figure 3:
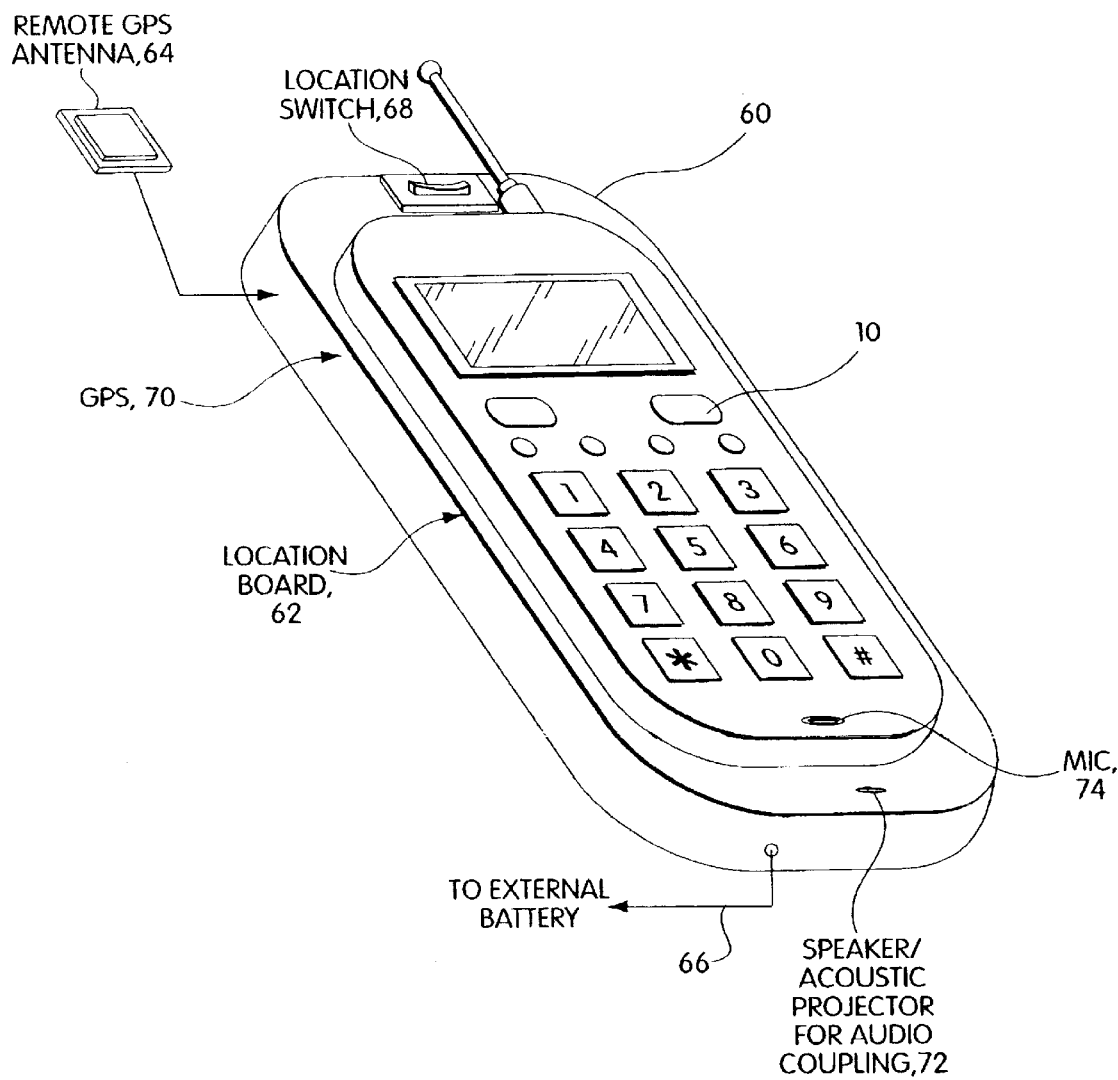
FIG. 3 is a diagrammatic illustration of the cradle embodiment of the subject invention in which the GPS receiver and location reporting unit are housed within the cradle, with the acoustic coupling being between a speaker in the cradle and the microphone in the wireless unit.

Referring now to FIG. 3, in one embodiment wireless handset 10 may be located in a handset cradle 60 which carries with it a location module 62 in the form of a printed circuit board, with the module corresponding to the aforementioned location reporting unit. A remote GPS antenna 64 is coupled to cradle 60, with power for the cradle coming from an external battery as illustrated at 66.

A location generating switch 68 activates the electronics within the cradle to generate the latitude and longitude as detected by an onboard GPS receiver 70, a speaker or an acoustic projector 72 is utilized as the audio coupling device to couple the audible information to a microphone 74 in handset 10, with the microphone being in spaced adjacency to the projector carried by the cradle.

When the phone is located within the cradle, depression of location switch 68 causes the verbal rendition of the latitude and longitude to be coupled from the speaker in the cradle to the microphone in the handset, thereby causing the handset to provide location reporting.

Figure 4:
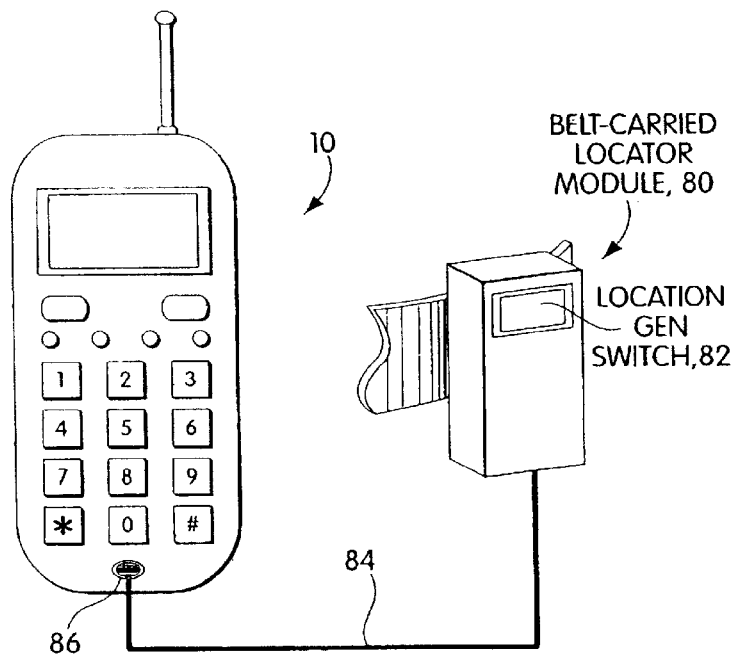
FIG. 4 is a diagrammatic illustration of a belt-carried locator module having its acoustic coupler attached at the microphone which is at the bottom of a standard wireless handset.

Referring now to FIG. 4, the locator module may be belt carried as illustrated at 80 with the module caring the aforementioned GPS receiver, GPS antenna, position decoder, speech generator, DTMF tone generator and audio amplifier. Here the location generating switch is carried on the belt carried module as illustrated at 82. As can be seen cable 84 is provided with an acoustic coupler 86 which is either suction cup attached or is glued on or mechanically attached when it is placed over the microphone carried by the handset.

As will be discussed, hereinafter, the acoustic projector is not such as to block sound from reaching the microphone from other sources, such that the handsets can be utilized in the normal mode with the acoustic coupler in place.

Figure 5:
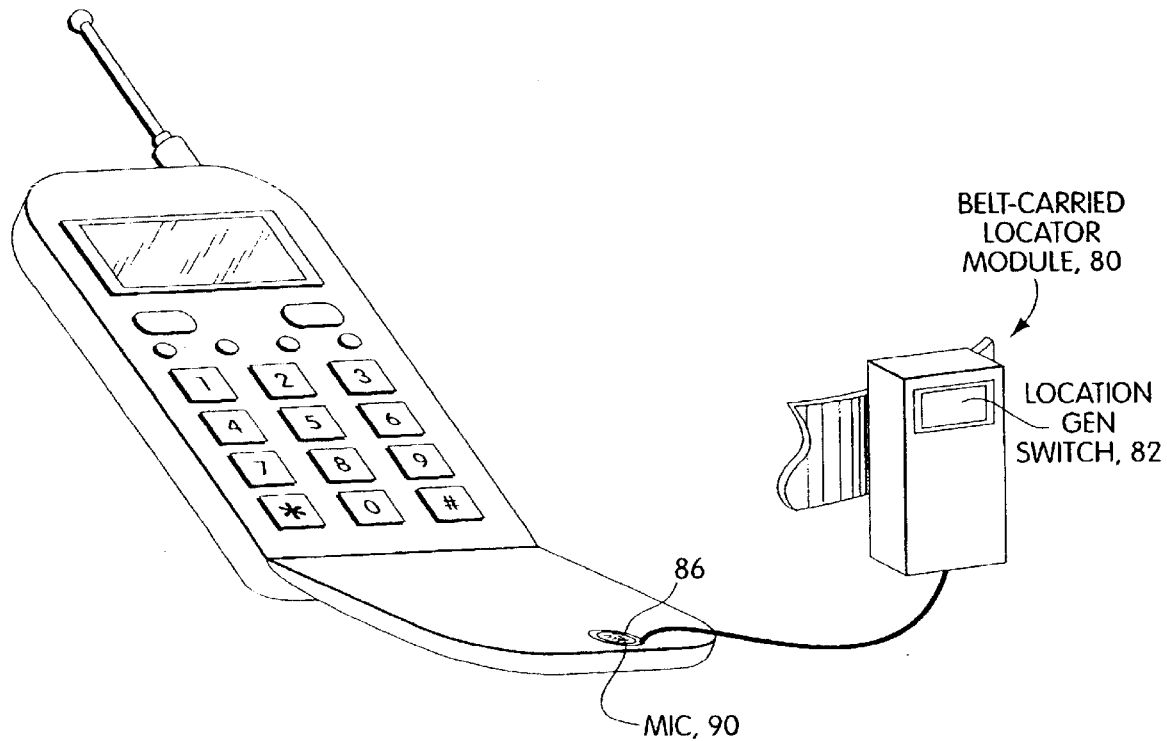
FIG. 5 is a diagrammatic illustration of a belt-carried locator module, with the acoustic coupler adjacent the microphone carried in the flip portion of a wireless flip phone.

Referring to FIG. 5, it will be appreciated that in some flip phone type handsets, microphone 90 maybe on the flip portion, with the acoustic coupler 86 being placed over the microphone after the flip down portion of the phone has been in flipped down.

Figure 6:
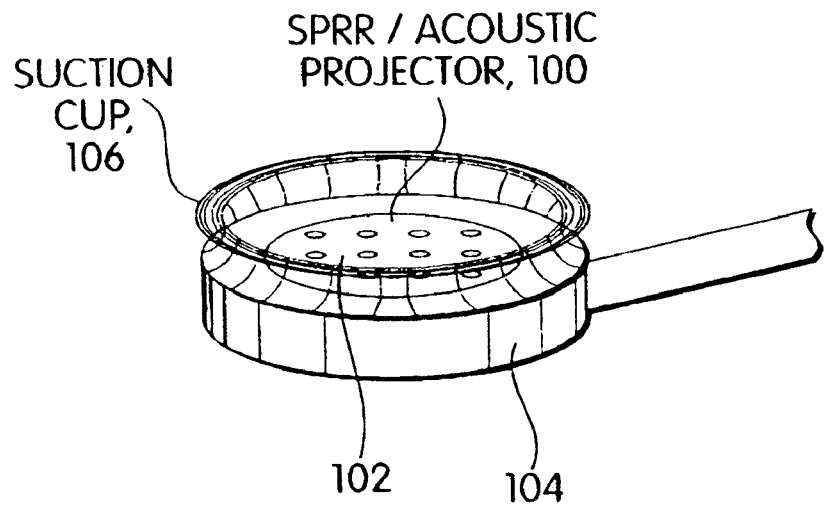
FIG. 6 is a diagrammatic illustration of a suction cup embodiment in which a speaker/acoustic projector is housed in a module having a suction cup which is adapted to be attached to the wireless phone; and, FIG. 7 is a diagrammatic illustration of a speaker/acoustic projector which is adhesively attached to the wireless phone by the utilization of a ring of adhesive around the speaker/acoustic projector.

Referring now to FIG. 6, the acoustic projector 100 may carry with it a speaker 102 mounted to a base 104, with a suction cup 106 attached to base 104. This permits suction cup mounting of the acoustic coupler to the handset or any surface of the transmitter where the microphone resides.

Figure 7:
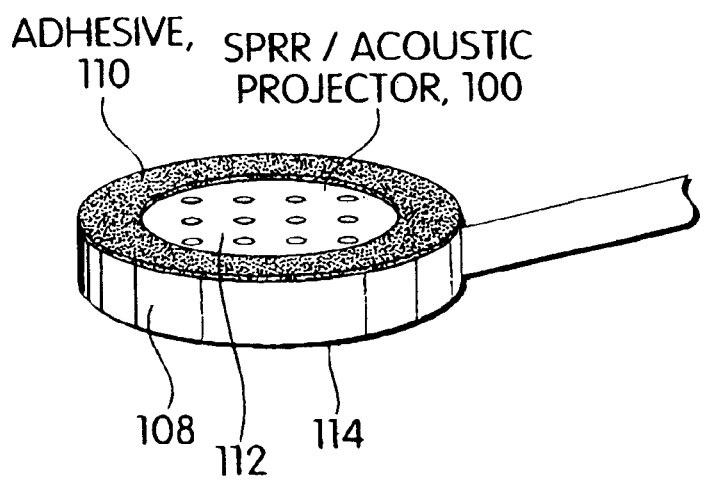

Referring now to FIG. 7, projector 100 may be provided with a base 106 to which is attached an adhesive ring 108, such that the acoustic coupler may be adhesively attached over or adjacent to the microphone used by the transmitter.

Here, as in FIG. 6, a speaker 112 may be positioned interior to the adhesive ring and may optionally be perforated so as to provide that sounds at the bottom side 114 of acoustic projector 100 are transmitted through to the microphone regardless of whether or not the acoustic coupling device is in place.

What will therefore be appreciated is that an exceedingly simple system is provided to adapt a wireless handset or other transmitter to one which reports position. It will also be appreciated that the subject system maybe utilized to automatically report any other type of information which either can be provided in synthesized voice or through digital signaling which results in tones being transmitted over the voice channel.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for reporting location of a wireless caller, comprising:
   a wireless transmitter having a microphone for generating acoustic signals to be wirelessly transmitted over a voice channel to a receiver where the acoustic signals are made available as an output thereof;
   a locator module for generating acoustic signals representing the geographic position of said module; and,
   an acoustic coupling unit coupled to said module and positioned adjacent said microphone for automatically coupling the acoustic signals representing geographic position to said microphone without human intervention, whereby the position of said locator module is transmitted over a voice channel by said wireless transmitter.

2. The system of claim 1, wherein said acoustic coupling unit includes an acoustic projector and means for affixing said projector adjacent said microphone.

3. The system of claim 2, wherein said acoustic coupling unit overlies said microphone.

4. The system of claim 3, wherein said acoustic coupling unit permits sounds generated from other than said projector to reach said microphone.

5. The system of claim 1, wherein said locator module includes a cradle into which said wireless transmitter is adapted to fit, said cradle positioning said acoustic coupling unit adjacent said microphone when said transmitter is in said cradle.

6. The system of claim 1, wherein said locator module includes a geoposition determining element.

7. The system of claim 6, wherein said geoposition determining element includes a GPS receiver.

8. The system of claim 6, wherein said locator module includes a speech synthesizer coupled to said geoposition determining unit for generating a verbal rendition of the position determined thereby.

9. The system of claim 6, wherein said locator module includes a DTMF encoder coupled to said geoposition determining unit for generating an audible tone rendition of the position determined thereby.

10. The system of claim 1, wherein said locator module generates acoustic signals coupled to said acoustic coupler unit carrying information other than position information.

11. A method of adapting a transmitter having a microphone and capable of transmitting information on a voice channel to transmit the position of the transmitter without modification thereof, comprising the steps of:

determining the location of the transmitter with a geoposition determining unit so as to produce a signal representing determined location, converting the determined location to a synthetic acoustic signal without human intervention and, coupling the acoustic signal to the microphone via an acoustic coupling device, whereby the transmitter can be adapted to provide position reporting without any change thereto and without human intervention.

12. A method of adapting a transmitter having a case and a microphone and capable of transmitting information on a voice channel to transmit the position of the transmitter without modification thereof, comprising the steps of:

determining the location of the transmitter using a geoposition determining unit which provides a determined location signal as an output;

converting the determined location signal to an acoustic signal without human intervention; and, coupling the acoustic signal with an acoustic coupling device to the microphone of the transmitter from a position outside the case of the transmitter, whereby the transmitter can be adapted to provide position reporting without any change thereto from a position outside the case of the transmitter.

13. The method of claim 12, wherein the acoustic signal includes synthesized voice.

14. The method of claim 12, wherein the acoustic signal includes DTMF tones.

* * * * *